US010474642B2

United States Patent
Xu et al.

(10) Patent No.: US 10,474,642 B2
(45) Date of Patent: Nov. 12, 2019

(54) MULTIBYTE HETEROGENEOUS LOG PREPROCESSING

(71) Applicant: NEC Laboratories America, Inc., Princeton, NJ (US)

(72) Inventors: Jianwu Xu, Lawrenceville, NJ (US); Biplob Debnath, Princeton, NJ (US); Hui Zhang, Princeton Junction, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 217 days.

(21) Appl. No.: 15/659,131

(22) Filed: Jul. 25, 2017

(65) Prior Publication Data
US 2018/0060314 A1    Mar. 1, 2018

Related U.S. Application Data

(60) Provisional application No. 62/381,752, filed on Aug. 31, 2016.

(51) Int. Cl.
*G06F 17/00* (2019.01)
*G06F 16/178* (2019.01)

(52) U.S. Cl.
CPC ................. *G06F 16/1794* (2019.01)

(58) Field of Classification Search
CPC ............ G06F 17/5068; G06F 17/5072; G06F 16/958; G06F 17/5077; G06F 11/3476
See application file for complete search history.

(56) References Cited

U.S. PATENT DOCUMENTS

2015/0094959 A1*    4/2015    Ning ................... G01V 99/005
                                                                  702/6

OTHER PUBLICATIONS

Xia Ning, HLAer: a System for Heterogeneous Log Analysis, SDM Workshop on Heterogeneous Machine Learning, Philadelphia, PA, Apr. 2014.
Adwait Ratnaparkhi, Learning to Parse Natural Language with Maximum Entropy Models, Machine Learning 34, 151-175, Feb. 1999.
http://unitexgramlab.org/, Unitex/GramLab, retrieved on Apr. 19, 2017.
http://www.europe.naverlabs.com/NAVER-LABS-Europe/History/Past-Research/XeLDA, XeLDA: Xerox Linguistic Development Architecture, retrieved on Apr. 19, 2017.

* cited by examiner

*Primary Examiner* — Truong V Vo
(74) *Attorney, Agent, or Firm* — Joseph Kolodka

(57) ABSTRACT

Methods and systems for log management include pre-processing heterogeneous logs and performing a log management action on the pre-processed plurality of heterogeneous logs. Pre-processing the logs includes performing a fixed tokenization of the heterogeneous logs based on a predefined set of symbols, performing a flexible tokenization of the heterogeneous logs based on a user-defined set of rules, converting timestamps in the heterogeneous logs to a single target timestamp format, and performing structural log tokenization of the heterogeneous logs based on user-defined structural information.

16 Claims, 6 Drawing Sheets

MULTIBYTE HETEROGENEOUS LOG PREPROCESSING

RELATED APPLICATION INFORMATION

This application claims priority to U.S. Application Ser. No. 62/381,752 filed on Aug. 31, 2016, incorporated herein by reference herein its entirety.

BACKGROUND

Technical Field

The present invention relates to log processing and, more particularly, to heterogeneous log preprocessing to tokenize logs with various different formats for timestamps.

Description of the Related Art

Heterogeneous information technology (IT) operational logs serve as inexpensive "sensors," recording and indicating the health status of enterprise computer systems. Many log processing and management systems are designed to analyze, understand and manage complex IT systems based on the operational logs. Because operational logs are unstructured texts that may be mixed with numbers, symbols, and any possible alphabets, it is important to break the unstructured logs into a set of smaller string chunks (called "tokens" herein). This process is called tokenization.

The tokens are the smallest units of the operational logs, which are the building element of a composite log. The tokenization process brings semi-structural information into the unstructured logs. However, IT operational logs can come from multiple sources written with different character encodings, where some logs were written in single byte encoding and others might be using multi-byte encoding scheme. For example, the colon symbol, ':', could have ASCII (American Standard Code for Information Interchange) encoding that is single-byte, or UTF (Unicode Transformation Format) encoding which might be in multi-byte format. Hence, the variation of character encoding makes tokenization of heterogeneous console logs difficult.

While automated tokenization may be desired, it potentially creates the issue of constraining tokenization to a set of pre-defined rules and data-driven criteria, which are applied universally to all heterogeneous logs. Furthermore, because computer logs originate from multiple sources, the formats of time stamps can vary across different log sources. This phenomenon makes it difficult for log processing and management systems to process heterogeneous logs.

SUMMARY

A method for log management includes pre-processing heterogeneous logs and performing a log management action on the pre-processed plurality of heterogeneous logs. Pre-processing the logs includes performing a fixed tokenization of the heterogeneous logs based on a predefined set of symbols, performing a flexible tokenization of the heterogeneous logs based on a user-defined set of rules, converting timestamps in the heterogeneous logs to a single target timestamp format, and performing structural log tokenization of the heterogeneous logs based on user-defined structural information.

A log management system includes a fixed tokenization module configured to perform a fixed tokenization of a plurality of heterogeneous logs based on a predefined set of symbols. A flexible tokenization module is configured to perform a flexible tokenization of the plurality of heterogeneous logs based on a user-defined set of rules. A timestamp conversion module is configured to convert timestamps in the plurality of heterogeneous logs to a single target timestamp format. A structural tokenization module is configured to perform structural log tokenization of the plurality of heterogeneous logs based on user-defined structural information. A log analysis module is configured to perform a log management action on the pre-processed plurality of heterogeneous logs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles provide comprehensive log preprocessing system using a set of predefined and ad hoc, user-provided rules to tokenize logs with different character encodings. The present embodiments recognize different formats of time stamps and standardize them for streamlined log processing and management.

Toward this end, the present embodiments provide a set of rules that captures delimiters used in computer logs. This set of rules is applicable in both single-byte and multi-byte character encodings. String matching is used to recognize and standardize multiple types of time stamp format. Users can furthermore manually input rules to accommodate specialized cases, such rules including, for example, specialized tokens and log formatting information.

Figure 1:
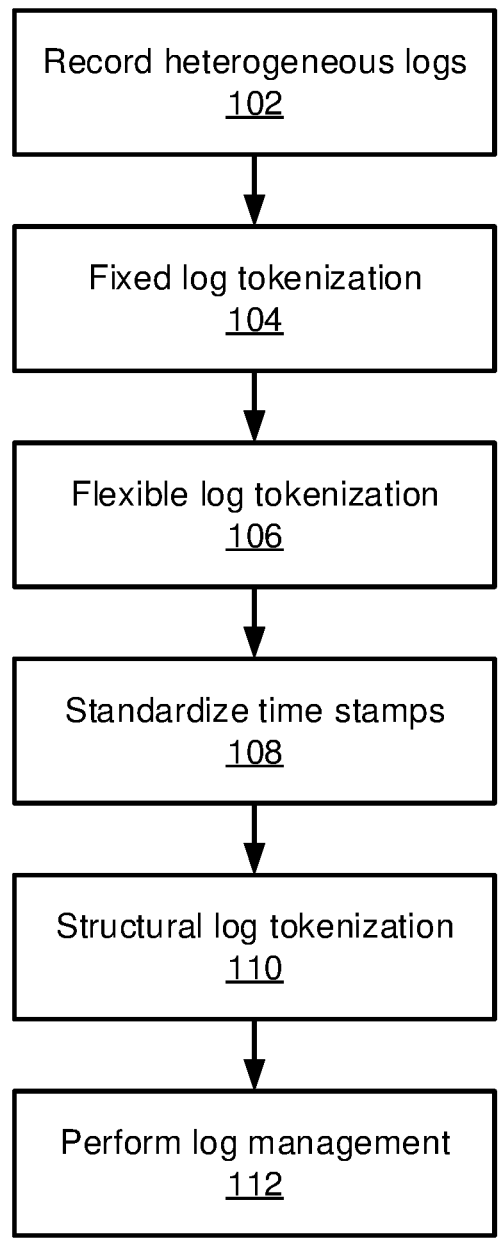
FIG. 1 is a block/flow diagram of log management with log preprocessing and tokenization in accordance with an embodiment of the present invention.

Referring now in detail to the figures in which like numerals represent the same or similar elements and initially to FIG. 1, a method for log preprocessing is illustratively depicted in accordance with one embodiment of the present principles. Block 102 records heterogeneous log files by multiple different programs, each of which may provide logs in different encodings, languages, and formats. Block 104 performs fixed log tokenization and matches the heterogeneous log files byte-by-byte against a set of fixed symbols and/or punctuation marks. This ensures that the substrings are split into multiple tokens if they are connected by any symbol or punctuation mark (including white space such as spaces and new lines).

Block 106 then performs flexible log tokenization, matching each substring against a set of rules provided by a user. The set of user-supplied rules may be based on, e.g., regular expressions that are specific to specific logs or types of logs. The user-supplied rules may also include rules for extracting relevant information from the logs.

Block 108 standardizes the time stamps of the heterogeneous logs. Different programs may record timestamps in different ways, including for example: epoch time, DD/MM/YYYY, DD/MM/YY, MM/DD/YYYY, MM/DD/YY, Month Day Year, Day Month Year, etc. Block 108 compares entries in the heterogeneous logs to a list of such timestamps formats to identify the format of each log (or each entry) and then converts the native timestamp format to a target timestamp format. For the purposes of the present embodiments, any target timestamp format may be selected as long as the same target timestamp format is consistently applied across all of the heterogeneous logs.

Block 110 performs structural log tokenization, using user-input token information to determine structural information for the logs. For example, if a particular log is in a comma-separated variable (CSV) format, then the user can provide this information explicitly. Block 110 thus provides a benefit in preventing excessive tokenization by keeping the high-level structure of the logs.

Block 112 then performs log management using the tokenized, standardized logs. Log management may include, for example, storing, indexing, searching, processing, modeling, and analyzing the tokenized logs. To achieve these different functions, a database may be used that stores, indexes and searches all the tokenized logs. Block 112 can build many different types of log models from the tokenized logs and analyze any new logs with the models built from log modeling.

Figure 2:
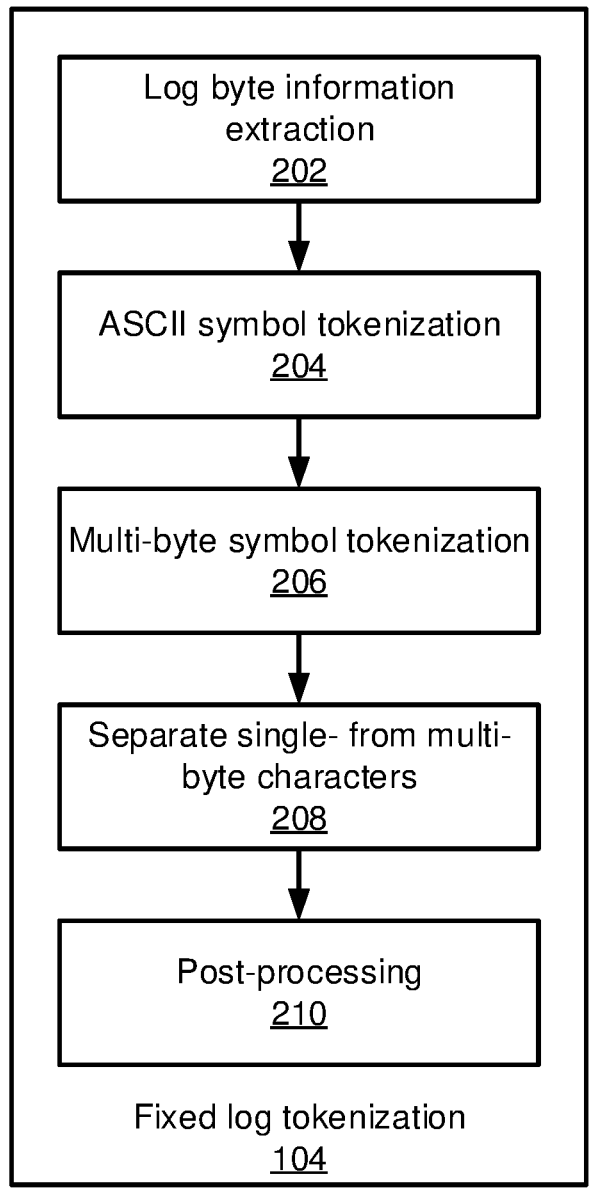
FIG. 2 is a block/flow diagram of fixed log tokenization in accordance with an embodiment of the present invention.

Referring now to FIG. 2, additional detail regarding fixed log tokenization 104 is shown. Fixed log tokenization includes multiple processing steps to handle single-byte logs, multi-byte logs, and logs that include a mixture of both. Fixed log tokenization uses, e.g., an end-of-line symbol (such as '\n') as a way to extract each line of each log for subsequent processing.

Block 202 extracts log byte information. Operational logs originate from different application components which may be developed in different programming languages. In addition, a mixture of single-byte and multi-byte character encodings can be used in the same log, or even in a single line of a log. Block 202 therefore extracts the character encoding information for each character in each log. This can be accomplished using the following pseudo-code:

```
Function getByteNumber(character)
    byte = 0
    For each bit in the character:
        Right shift the character by one bit
        Apply bit AND operation on the shifted value with the value 1
            If the result is 0, mark the shift number and break out of the
            for-loop
    If the shift number is 0, set byte = 1
    If the shift number is 1 or >7, then set byte = 0
    Return byte
```

The return value of this pseudo-code will be the byte information of each character in the logs, indicating whether the character is encoded with a single byte or with multiple bytes.

Block 204 performs ASCII symbol tokenization, inserting white space before and after a set of ASCII symbols or punctuation marks. This may be performed without any manual inputs according to a predefined set of symbols that is applied universally across the heterogeneous logs. One exemplary set of symbols may include, for example, the following single-byte symbols: ' ~ ! , @ # $ % ^ & * ( ) + = { } [ ] \ | ; ' " < > . ? ‖.

Block 204 matches each character of each log against each symbol in the above set. If a character is matched, then white space is inserted before and after that symbol. Some symbols are not considered in this set. For example, the forward slash, '/', is not in the set because this symbol is often used as a separator in uniform resource locator (URL) links. In log processing and management systems, it is more syntactically and semantically meaningful to keep an entire URL link together as one entity, rather than subject it to over-tokenization.

Block 206 then performs multi-byte symbol tokenization, inserting white space before and after each multi-byte symbol in each log. One exemplary set of multi-byte symbols may include, for example, the following multi-byte symbols: ` ~ ! @ # $ % — & * ( ) ＿ + = 「」 ｜ ; : ' < > ? ｡ | | ¥. When compared to the single-byte symbols set used by block 204, the multi-byte symbols set includes many symbols with the same semantic meaning, but using a different character encoding.

Block 208 separates single-byte and multi-byte characters. In an operational log with a mixture of both types of characters, separation of the two types of characters will ensure correct comparison of tokens across different log messages during log management.

Block 210 performs post-processing for the fixed log tokenization, including removal of special markers (e.g., the character '\r', which is used as a carriage return in some file formats, the first UTF encoding markers, etc.). Post-processing block outputs a clean version of the first tokenization stage.

Figure 3:
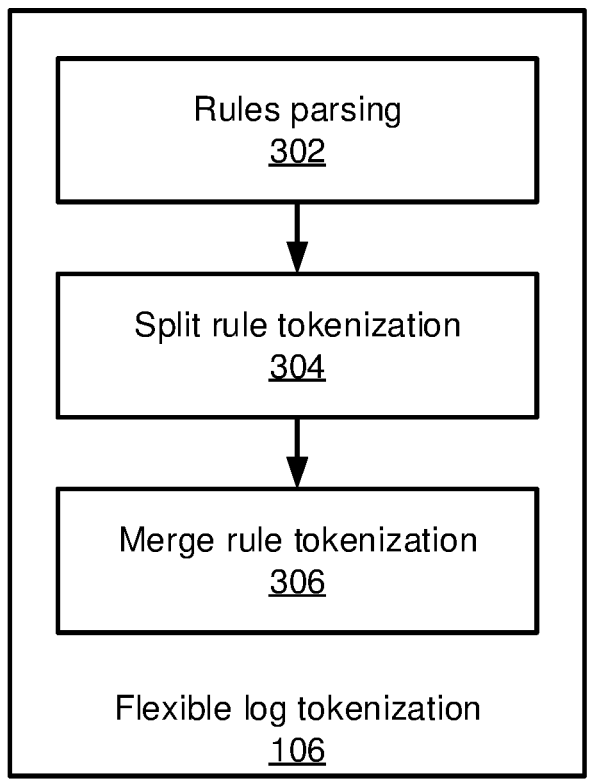
FIG. 3 is a block/flow diagram of flexible log tokenization in accordance with an embodiment of the present invention.

Referring now to FIG. 3, additional detail regarding flexible log tokenization 106 is shown. Because a log pre-processing system needs to handle heterogeneous logs, fixed log tokenization 104 is designed to handle general pre-processing. However, some applications involve logs in a specific format that the fixed log tokenization 104 cannot handle. In still other applications, users may intentionally provide domain knowledge. For example, users may be interested in the amount of memory used by an application, in which case memory designators (such as KB or MB) would be split from their associated numbers, for example splitting 1234 KB into "1234" and "KB". This task cannot be accomplished using fixed log tokenization 104, so flexible log tokenization 106 accepts user inputs to handle such special cases.

Block 302 parses user-supplied tokenization rules. An example of such rules might resemble the following:

[split]
^([0-9]+)(KB|MB|GB|TB|kb|mb|gb|tb|kB|mB|gB|tB|Kb|Mb|Gb|Tb)$
^([0-9]+)(meters|kg)$
^([0-9]+)(KB|MB)(Size)$
[merge]
^([0-9]+)$ . ^([0-9]+) $ In this example, a set of "split" rules designate that, for example, numbers should be split by byte size designators and that numbers should be split from length and mass units. Another set of "merge" rules designate that subsequent sets of numbers should be merged if separated by a period (indicating a decimal representation).

In a split rule, if the log contains a certain format of strings (designated by a regular expression), it will be split into multiple substrings based on the rules. In a merge rule, if the log contains certain consecutive substrings, they will be merged together into one single string. The merge rule in particular addresses situations where fixed string tokenization may over-tokenize for given application, for example splitting a decimal representation of a number into multiple tokens due to its inclusion of a period.

Each rule is given a single line in this embodiment, but it should be understood that other separators may be used besides a newline. Similarly, although each rule is shown herein as a regular expression, other forms for denoting the rules may be used instead. The symbols '^' and '$' as shown above are used as anchors, meaning the beginning of the matched strings should be the first entity, and the ending should be the last part of the regular expression. For example, the rule ^([0-9]+)(KB|MB)(Size)$ will split 1234 KBSize into 1234 KB Size.

Block 304 performs split rule tokenization, using the "split" rules defined by the user, matching each string against each rule. If the string is matched, then it will be split into multiple substrings. This is achieved by the following pseudo-code:

```
Function splitRuleTokenization(string, splitRules,fileOutputHandler)
    For each split rule in the splitRules:
        Create a regex for the given split rule
        Match the input string with the regex
    If it matches,
        then split the string into multiple substrings and print to the
        fileOutputHandler
    Else,
        return
Done
```

The output of this pseudo-code will include split tokenizations, if there are any, based on the regular expression rules provided by the user.

Block 306 performs merge rule tokenization, using the "merge" rules defined by the user, matching sets of consecutive substrings against each rule. If the rule is matched, then the matched substrings will be merged into a single string. This is achieved by the following pseudo-code:

```
Function    mergeRuleTokenization    (fileInputHandler,    mergeRules,
fileOutputHandler)
    For each merge rule in the mergeRules:
        Create a regex for the given merge rule
        While fileInputHandler has not reached to the end of the log
        message
            Match the multiple input strings with the regex
            If this set of strings match,
                merge the multiple substrings into one string and
                print to the fileOutputHandler
            Else,
                move on to next string
        Done
    Done
```

The output of the merge rule tokenization 306 will include merged tokenizations, if there are any, based on the regular expression rules provided by the user.

Figure 4:
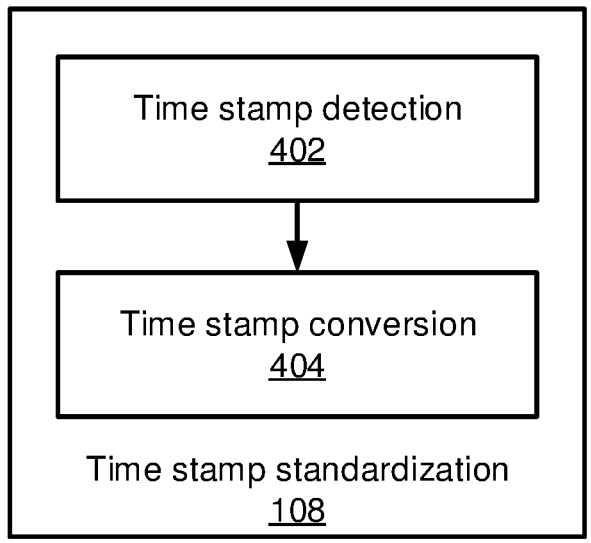
FIG. 4 is a block/flow diagram of time stamp standardization in accordance with an embodiment of the present invention.
Figure 5:
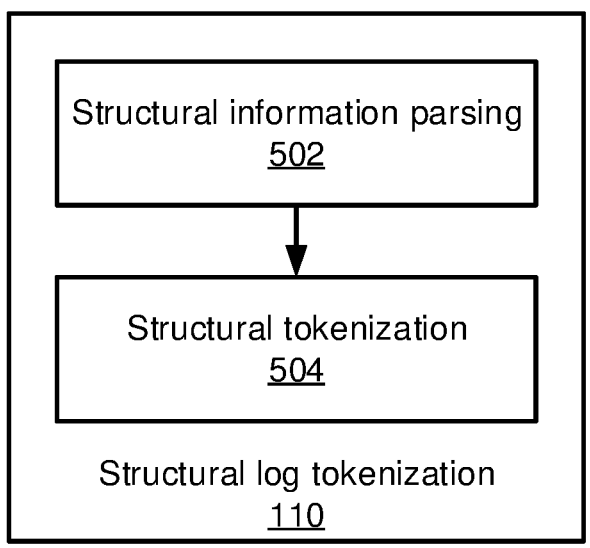
FIG. 5 is a block/flow diagram of structural log tokenization in accordance with an embodiment of the present invention.

Referring now to FIG. 4, additional detail is provided regarding time stamp standardization 108. Time stamp standardization 108 takes the output of the flexible log tokenization 106 and generates output that converts disparate types of time stamp format into a fixed and consistent format.

Because the variety of available time stamp formats in heterogeneous logs can be substantial, a systematic and consistent approach is needed to standardize all time stamps. This streamlines the following log management and analytics. To accomplish this task, block 402 first detects whether time stamps exist in a given log message. Block 404 then converts the detected time stamps into the target format.

Time stamp detection 402 uses a list of time stamp formats, attempting to match information in the logs to one or more of the formats. An exemplary, non-limiting list of such formats includes:

YYYYMMDD HH:MM:SS.mss
YYYY/MM/DD HH:MM:SS.mss
DD/MM/YYYY HH:MM:SS.mss
YYYYMMDD HH:MM:SS
YYYY/MM/DD HH:MM:SS
DD/MM/YYYY HH:MM:SS
YYYY-MM-DD HH:MM:SS.mss
DD-MM-YYYY HH:MM:SS.mss
YYYY-MM-DD HH:MM:SS
DD-MM-YYYY HH:MM:SS YYYY-MM-DDTHH:MM:SS
YYYY-MM-DDTHH:MM:SS.mss
YYYYMMDDTHH:MM:SS
YYYYMMDDTHH:MM:SS.mss
DD-MM-YYYYTHH:MM:SS.mss
DD-MM-YYYYTHH:MM:SS
YYYYMMDDTHHMM
YYYYMMDDTHHMMSS
YYYYMMDDTHHMMSSMSS
DateThh:mm:ssTZD
DateThh:mmTZD
04/Mar/2006:13:27:54-0537
Sat, 4 Mar. 2006 13:27:54
MM-DD-YYYY HH:MM:SS
Jan 17 HH:MM:SS YYYY
Jan/17/YYYY HH:MM:SS
17/Jan/YYYY HH:MM:SS
YYYYMMDDHHMMSS
YYYY-MM-DD HH:MM:SS YYYY/MM/DD HH:MM:SS
MM/DD/YYYY HH:MM:SS
Jan 17 HH:MM:SS
Jan 17, YYYY HH:MM:SS.mss
Jan 17, YYYY HH:MM:SS
YYYY-MM-DD, HH:MM:SS YYYY/MM/DD, HH:MM:SS
YYYY-MM-DDTHH:MM:SS YYYY/MM/DDTHH:MM:SS
MM/DD/YYYY, HH:MM:SS
YYYY Jan 17 HH:MM:SS
YYYY/MM/DD 16時05分05秒

In the above formats, Y indicates a digit from a year, M indicates a digit from a numerical month, D denotes a digit from a day, H denotes a digit from an hour, S denotes a digit from seconds, mss/MSS denotes milliseconds in a three-digit format, etc. Certain time stamp formats use mixed representations such as, e.g., 04/Mar/2006:13:27:54-0537. The final example in the list is a time stamp format widely recognized in Japan. The set of time stamp formats covers most of the widely used formats that will be found in a heterogeneous logging environment.

The time stamp matching may be achieved by the following pseudo-code:

```
Function timeStampDetection(fileInputHandler, timeStampList)
    Location array l is set to empty
    Starting from the beginning of log message until the end:
        For each time stamp format in the timeStampList:
            Match the multiple strings tokenized by while space against
            the time stamp format
            If it matches:
                Mark the location l
            Else:
                Continue the next string
        Done
    Return location array l
```

Once the location of a time stamp is detected, time stamp conversion 404 converts that time stamp to a target format. In the present embodiments the target format will be described as YYYY/MM/DD HH:MM:SS.mss, but it should be understood that any appropriate format may be used instead. This conversion makes succeeding log analysis and management simpler and may be achieved by the following pseudo-code:

```
Function   timeStampConversion(fileInputHandler,   timeStampLocationList,
fileOutputHandler)
    Starting from the beginning of log message until the end:
    For each time stamp location l in the timeStampLocationList:
        If the location of the string matches to l:
            Convert the time stamp into the fixed one: YYYY / MM /
            DD HH : MM : SS . mss
            Print the stamp to fileOutputHandler
            Jump to the string after the time stamp
            Move the stamp location l to the next one
        else:
            print the string to fileOutputHandler and move to the next
            string
    Done
Done
```

Figure 7:
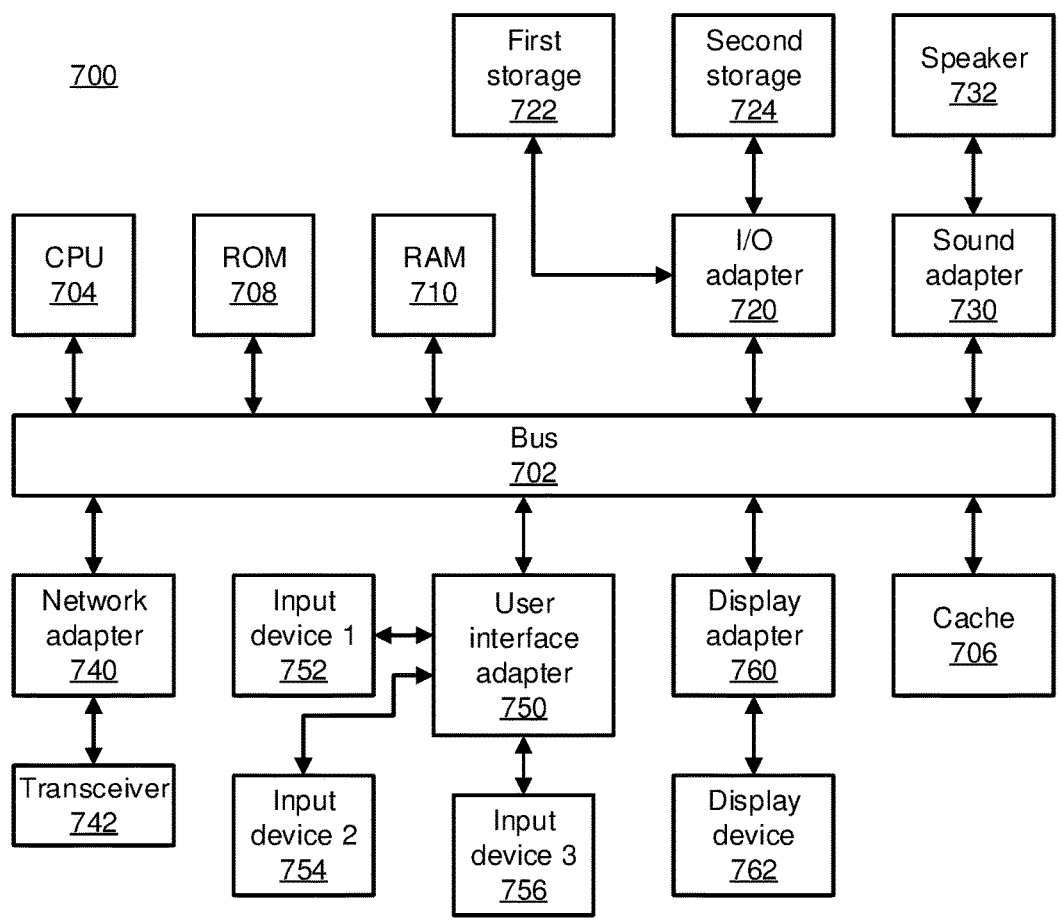
FIG. 7 is a block diagram of a processing system in accordance with an embodiment of the present invention.

Referring now to FIG. 7, additional detail on structural log tokenization 110 is provided. Structural log tokenization 110 takes the output from time stamp standardization 108 and generates the final pre-processed log output. Structural information about the logs is provided by the user and is used to perform tokenization.

Syntactic information is extracted from each log using unsupervised clustering. This computes a similarity measurement between each pair of log messages. A tokenization based on white space is used to isolate each string for comparison, with each white space (e.g., spaces, newlines, etc.) being treated equally. In alternative embodiments, different white spaces may be differentiated. For example, if the logs are in a CSV format, then the white space before and after a comma has more structural information than any other white space within each column.

Structural information parsing 702 uses user-provided log structural information from, e.g., a configuration file. An example of the structural information may be provided as, e.g., delimeter=','. This information denotes that the comma provides the overall structure of the logs. The delimiter is then used as the first level of anchor in the computation of log similarity measures. In the tokenization of log messages based on white spaces, white spaces that come before and after the delimiter are used for the alignment of log segments.

Structural tokenization 704 uses the parsed structural information from the user to perform structural using, for example, the following pseudo-code:

```
Function structuralTokenization (tokenizedString,structuralDelimiter)
    Set log message index l₁ =0
    While (l₁ < length of string and token[l₁] != structuralDelimiter):
        tokenCollection[l₁], token[l₁]
        l₁++
    Done
    Return tokenCollection
```

This function returns the structural logs based on the delimiter set by the user.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
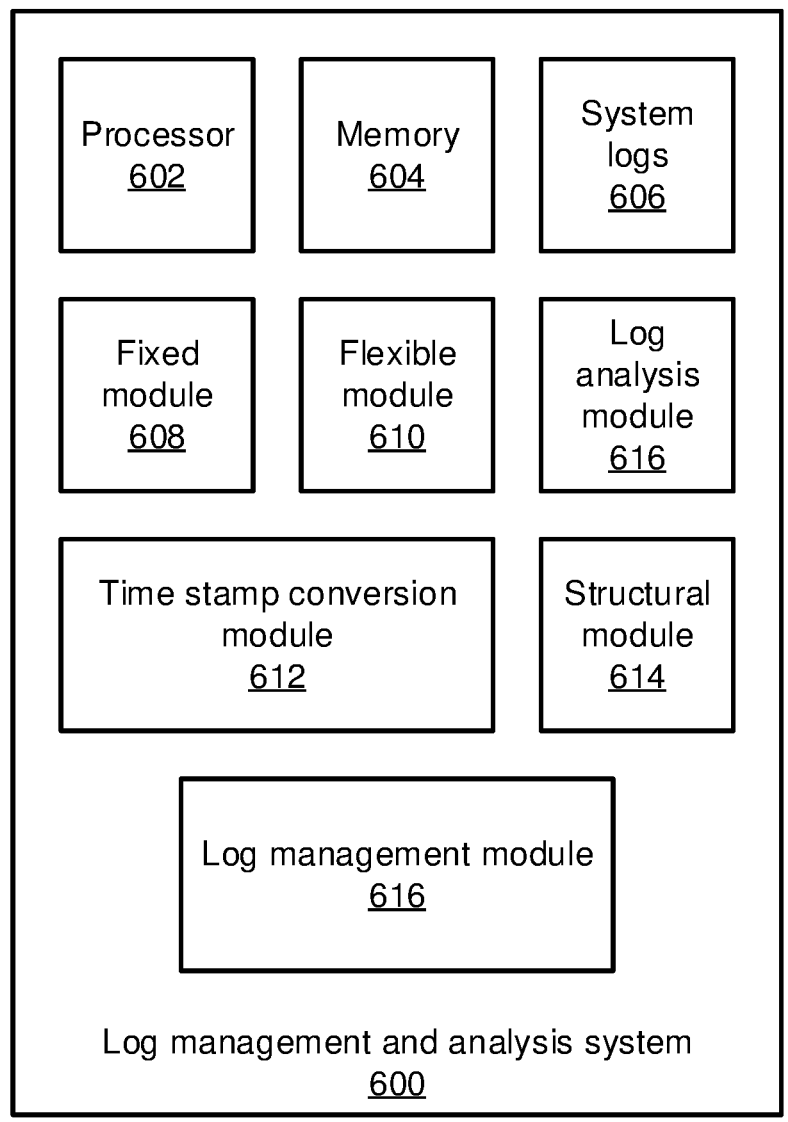
FIG. 6 is a block diagram of a log management and analysis system in accordance with an embodiment of the present invention.

Referring now to FIG. 6, a log management and analysis system 600 is shown. The system 600 includes a hardware processor and memory 604. The memory stores heterogeneous system logs 606 that are collected by, e.g., system event monitors or by one or more individual applications, each storing event information in a respective format in a log file. It should be understood that other types of logging are contemplated, and that the present embodiments include logging types that are not based on discrete files but may, for example, be kept in volatile memory or in any other storage mechanism. The system 600 furthermore includes one or more functional modules that may, in some embodiments be implemented as software that is stored in memory 604 and that is executed by hardware processor 602. In alternative embodiments, the functional module(s) may be implemented as one or more discrete hardware components in the form of, e.g., application specific integrated chips or field programmable gate arrays.

A fixed log tokenization module 608 performs fixed log tokenization based on a set of predefined delimiters. A flexible module 610 performs flexible log tokenization using a set of user-supplied rules. Time stamp conversion module 612 converts individual timestamps from the heterogeneous logs to a single target timestamp format. A structural tokenization module 614 then tokenizes the logs according to user-supplied structural information such as, e.g., a delimiter. Block 616 performs log analysis and management functions using the fully tokenized and standardized log information.

Referring now to FIG. 7, an exemplary processing system 700 is shown which may represent the log management and analysis system 600. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for log management, comprising:
   pre-processing a plurality of heterogeneous logs, said pre-processing comprising:
   performing a fixed tokenization of a plurality of heterogeneous logs based on a predefined set of symbols;
   performing a flexible tokenization of the plurality of heterogeneous logs based on a user-defined set of rules;
   converting timestamps in the plurality of heterogeneous logs to a single target timestamp format; and
   performing structural log tokenization of the plurality of heterogeneous logs based on user-defined structural information; and
   performing a log management action on the pre-processed plurality of heterogeneous logs.

2. The method of claim 1, wherein performing fixed log tokenization comprises tokenizing according to the predefined set of symbols in both a single-byte encoding and in a multi-byte encoding.

3. The method of claim 1, wherein performing fixed log tokenization comprises removing special characters from tokens.

4. The method of claim 1, wherein the user-defined set of rules comprises a split rule that determines when and how a string is to be broken into substrings and a merge rule that determines when and how substrings are to be merged into a single string.

5. The method of claim 3, wherein the user-defined set of rules comprises at least one merge rule that merges substrings that were split by the fixed tokenization.

6. The method of claim 1, wherein flexible tokenization is performed on the output of the fixed tokenization.

7. The method of claim 1, wherein converting timestamps comprises detecting timestamps in the plurality of heterogeneous logs based on a set of known timestamp formats.

8. The method of claim 1, wherein the user-defined structural information includes at least one delimiter.

9. A log management system, comprising:
   a fixed tokenization module configured to perform a fixed tokenization of a plurality of heterogeneous logs based on a predefined set of symbols;
   a flexible tokenization module configured to perform a flexible tokenization of the plurality of heterogeneous logs based on a user-defined set of rules;
   a timestamp conversion module configured to convert timestamps in the plurality of heterogeneous logs to a single target timestamp format;
   a structural tokenization module configured to perform structural log tokenization of the plurality of heterogeneous logs based on user-defined structural information; and
   a log analysis module configured to perform a log management action on the pre-processed plurality of heterogeneous logs.

10. The system of claim 9, the fixed log tokenization module is further configured to tokenize according to the predefined set of symbols in both a single-byte encoding and in a multi-byte encoding.

11. The system of claim 9, the fixed log tokenization module is further configured to remove special characters from tokens.

12. The system of claim 9, wherein the user-defined set of rules comprises a split rule that determines when and how a string is to be broken into substrings and a merge rule that determines when and how substrings are to be merged into a single string.

13. The system of claim 12, wherein the user-defined set of rules comprises at least one merge rule that merges substrings that were split by the fixed tokenization.

14. The system of claim 9, the flexible log tokenization module is further configured to perform flexible tokenization on the output of the fixed tokenization.

15. The system of claim 9, wherein the timestamp conversion module is further configured to detect timestamps in the plurality of heterogeneous logs based on a set of known timestamp formats.

16. The system of claim 9, wherein the user-defined structural information includes at least one delimiter.

* * * * *